3,535,853
AIR CLEANER
Jesse R. Brown and Charles W. Hahl, Pomona, Calif., assignors to Vortox Mfg. Company, Claremont, Calif., a corporation of California
Filed June 18, 1968, Ser. No. 738,010
Int. Cl. B01d 50/00
U.S. Cl. 55—337                            14 Claims

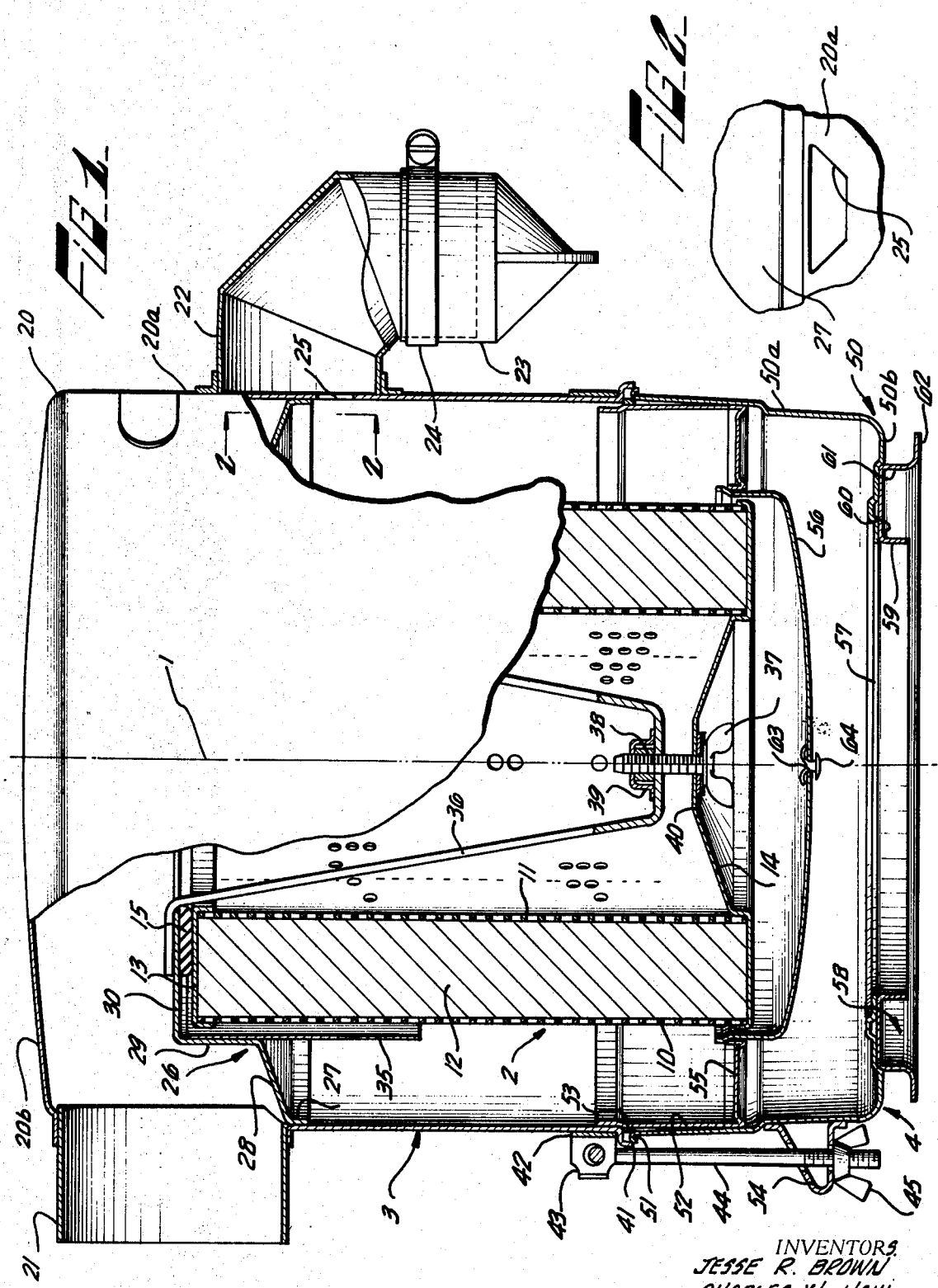

ABSTRACT OF THE DISCLOSURE

A cylindrical air cleaner adapted to be mounted with its axis in a vertical position and provided with a downward facing air inlet. An unloader valve for the removal of centrifugally separated dust particles is attached to the end of an elbow tube mounted on the cylindrical exterior side wall of the air cleaner such that the valve faces downward. The elbow tube communicates with the interior of the air cleaner through an elongated slot in the side wall of the air cleaner oriented transverse to the axis. A rain shield surrounding the inlet keeps moisture from entering the air cleaner. A brad is inserted in a small, downward facing hole in the shield connecting the interior of the air cleaner with the atmosphere. The head of the brad is situated on the outside of the air cleaner.

BACKGROUND OF THE INVENTION

This invention relates to air cleaners and, more specifically, to an air cleaner of the type in which separation of dust by centrifugal force and by filtering both take place within a single housing.

Air cleaners in which dust is separated by centrifugal force and by filtering within a single housing are commonly employed in the intake system of an internal combustion engine. Typical of this type of air cleaner is that disclosed in Pat. 3,078,650 of Dale K. Anderson and William R. Wolff issued Feb. 26, 1963. A replaceable dry paper filter having an impervious cylindrical surface through which the air to be filtered passes is surrounded by a cylindrical housing that is adapted to be mounted with its axis oriented in a vertical position. The cylindrical surfaces of the housing and the filter define an annular passage. The exterior of an inlet tube that opens into the top of the annular passage protrudes upwardly from one end of the housing or the side of the housing. A protective cap is placed over the opening of the inlet tube to prevent falling moisture and dust from entering the air cleaner.

An outlet tube, which is at a lower pressure than the inlet tube, carries the clean air from the filter element to the engine manifold. A louvered ring situated at the top of the annular passage in the path of air entering from the inlet tube imparts to the incoming air a downwardly swirling motion. As the air swirls around the annular passage, some of the dust particles, mostly the larger ones, are separated by centrifugal force and drop to the bottom of the air cleaner where they are either collected in a receptacle or ejected from the air cleaner through an unloader valve. If a receptacle is used, it must be emptied from time to time. In this respect, the unloader valve is superior because the centrifugally separated dust particles are automatically ejected through the valve as the pressure in the air cleaner pulsates in the course of engine operation.

A modification of the air cleaner described above, in which the air enters at the bottom of the annular passage and swirls upwardly, has advantages. For example, no protective cap is necessary for the inlet and a more compact design is possible. Specifically, the air cleaner is mounted with its cylindrical axis in a vertical position, while the inlet is located at the bottom of the air cleaner in alignment with its axis and faces downward. In the modification, the conventional practice of mounting an unloader valve at the bottom of the air cleaner would be ineffectual because little separation of dust by centrifugal force takes place so near the air inlet.

SUMMARY OF THE INVENTION

According to the invention, a cylindrical air cleaner mounted with its axis in a vertical position and provided with a downward facing inlet in alignment with the axis is adapted for removal of centrifugally separated dust by an unloader valve. Specifically, the valve is attached to an elbow tube mounted on the exterior cylindrical side wall of the air cleaner. The elbow tube is oriented so the valve faces downward, thereby permitting the centrifugally separated dust to drop out of the elbow tube when the valve opens. As an alternative to the unloader valve, a Mason jar or other container could be used, or the tube could be attached to an aspirator system.

An important feature of the invention is the provision of an elongated slot in the exterior wall of the air cleaner where the elbow tube is mounted to provide communication between the interior of the air cleaner and the unloader valve. The slot is oriented transverse to the vertical axis of the air cleaner and is preferably trapezoidal. It has been found that such an elongated slot affords much more efficient removal of dust particles by centrifugal force than a circular opening the size of the elbow tube.

Another feature of the invention is a rain shield that surrounds the inlet to keep water from entering the air cleaner and a hood having a larger diameter than the inlet. The hood, which is located within the air cleaner in spaced relationship from the inlet, prevents a direct passage for incoming air from the inlet to the annular passage. The incoming air is diverted smoothly to the annular passage by the contour of the hood.

The filter element is located above the hood and a small hole is located in the hood within the area encompassed by the inlet. A brad is inserted in the hole with its head facing the atmosphere. While the engine is running, the vacuum it creates holds the head of the brad against the hole, thereby sealing it. When the engine stops, the head of the brad drops away from the hole and any moisture that may have collected in the hood drops through the hole and the inlet to the atmosphere.

BRIEF DESCRIPTION OF THE DRAWING

The features of a specific embodiment of the invention are illustrated in the drawing, in which:

FIG. 1 is a side elevation view partially in section of an air cleaner embodying the principles of the invention; and FIG. 2 is a front elevation view taken through the section designated in FIG. 1, which shows the shape of the slot between the interior of the air cleaner and the elbow tube.

DESCRIPTION OF A SPECIFIC EMBODIMENT

In the drawing, a cylindrical air cleaner having an axis 1 is shown in the position in which it is adapted to be mounted for use with an internal combustion engine. The air cleaner has three main parts in alignment with axis 1, namely, a dry paper filter element 2, a top 3, and a bottom 4. Filter element 2 which is of conventional construction, has a cylindrical, perforated metal sheet 10 that forms its outer surface and a smaller cylindrical, perforated metal sheet 11 that forms its inner surface. The annular space between sheets 10 and 11 is filled with folds of dry paper 12, which filters the dust from the air. Sheets 10 and 11 are supported at their top ends by an annular, imperforate cap 13 and are supported at their lower ends by the peripheral portion of a circular imperforate cap 14. Cap 13 has an annular rubber gasket 15 cemented to its outer surface.

Top 3 includes a housing 20 with a cylindrical side wall 20a and a top end wall 20b. An outlet tube 21 is attached and sealed to side wall 20a at its juncture with end wall 20b. Alternatively, tube 21 could be attached to end wall 20b and extend upwardly. An elbow tube 22 is attached and sealed to side wall 20a at a lower point than outlet tube 21. Communication between elbow tube 22 and the interior of the air cleaner is provided by an elongated slot 25, which, as depicted in FIG. 2, is an inverted trapezoid oriented with its bases transverse to axis 1. A rubber unloader valve 23 of conventional construction is attached to the end of elbow tube 22 by a clamp 24. Elbow tube 22 is oriented so valve 23 faces downward. Thus, when unloader valve 23 opens, any dust collected therein drops out. While the engine is running, unloader valve 23 in general opens and closes with the pressure pulsations. Specifically, when the engine pulsations produce a vacuum in the air cleaner, unloader valve 23 closes and when the engine pulsations produce a pressure within the air cleaner approaching that of the atmosphere, valve 23 opens. The weight of the dust and water collected in valve 23 also helps open valve 23. An annular support 26 has an outer flange portion 27, an upwardly slanting portion 28, a cylindrical portion 29, and an inner ring portion 30. Flange portion 27 is attached and sealed to the interior surface of side wall 20a. A cylindrical skirt 35 is attached to cylindrical portion 29 and extends downwardly to surround the portion of filter element 2 in the vicinity of slot 25. A V-bracket 36 is attached to the top surface of inner ring portion 30 and extends through the hollow center of filter element 2 to a point adjacent to the top of cap 14. Filter element 2 is attached to top 3 by a wing bolt 37, which passes through an opening in cap 14 and is secured to V-bracket 36 by a nut 38, or similar threaded fastener. The position of nut 38 is permanently maintained on the top of the vertex of V-bracket 36 by a clamp 39. A gasket 40 located at the head of wing bolt 37 seals the opening in cap 14 through which wing bolt 37 passes to engage nut 38. As shown in FIG. 1, V-bracket 36 aligns the components of top 3 and filter element 2 with vertical axis 1. When wing bolt 37 is tightened down on V-bracket 36, gasket 15 is forced against the lower surface of inner ring portion 30 to form a seal between support member 26 and end cap 13 of filter element 2. Side wall 20a is terminated in a lip 41. Above lip 41 a band 42 is clamped around side wall 20a. A plurality of brackets 43 for receiving a like number of rod connectors 44 are attached to band 42. Each of rod connectors 44 has a wing nut 45 on its threaded end.

Bottom 4 includes an outer cover 50 with a cylindrical side wall 50a and an annular end wall 50b. The top of side wall 50a has a lip 51 that fits under lap 41 when the air cleaner is assembled, as shown in FIG. 1. A cylindrical skirt 52, which extends above the top of side wall 50a, is attached to the interior surface of side wall 50a. A rubber gasket 53 surrounds skirt 52 directly above lip 51 to form a seal between top 3 and bottom 4 when the air cleaner is assembled. A plurality of brackets 54, which are attached to side wall 50a, are adapted to receive rod connectors 44 and to clamp top 3 and bottom 4 together when wing nuts 45 are tightened down, as shown in FIG. 1. A conventional louvered ring 55 is situated in the annular area between the inner surface of side wall 50a and end cap 14. The outer periphery of louvered ring 55 is attached to the inner surface of side wall 50a and a dish-shaped hood 56 is attached to the inner periphery of louvered ring 55. Hood 56 is spaced slightly outward and downward from the bottom edge of filter element 2 and is oriented so its concave surface faces upward to form a receptacle for the storage of moisture that is drawn into the air cleaner from the atmosphere. End wall 50b has a circular opening 57 that serves as the inlet to the air cleaner. A rain shield 58 surrounds opening 57 and is attached to the bottom of end wall 50b. Rain shield 58 has an inner cylindrical portion 59, an intermediate ring portion 60 that is attached to bottom wall 50b, an outer cylindrical portion 61, and an outer flared portion 62.

The diameter of hood 56 is larger than opening 57, thus forming an indirect path for airflow through the inlet to the interior of the air cleaner. This helps to keep moisture and large foreign bodies out of the interior of the air cleaner. The surface of hood 56 is contoured to provide smooth airflow through the inlet into the interior of the air cleaner. The center of hood 56 has a small hole 63 through it. A brad 64 is inserted in hole 63 with its head facing the inlet. The arms of brad 64 are bent outwardly against the interior surface of hood 56 to secure brad 64 in hole 63 such that it is capable of slight movement along axis 1. When the engine is running, the vacuum created within the air cleaner draws the head of brad 64 up against hole 63, thereby sealing it. When the engine is not running, the head of brad 64 drops away from hole 63, as shown in FIG. 1, and the moisture collected within hood 56 passes through hole 63 and out of the inlet. In this way, an exit is provided for the removal of moisture collected within the air cleaner without inefficiency in the operation of the air cleaner. Hole 63 alone without brad 64 to seal it during operation would appreciably reduce the efficiency of the removal of dust by centrifugal force, thus requiring more frequent servicing of the filter element.

In operation, air is drawn through the inlet of the air cleaner and is smoothly guided into louvered ring 55 by the contour of hood 56. Louvered ring 55 imparts a swirling motion to the air passing through it so as to exert centrifugal force on dust particles in the air. From louvered ring 55, air swirls around the annular passage defined by the interior surface of side wall 20a and sheet 10. As the air swirls upward in the annular passage, dust particles are thrown outward and pass through slot 25 into elbow tube 22.

It has been discovered that a much more efficient removal of dust by centrifugal force results with an elongated slotted opening between the annular passage and elbow tube 22 than with a circular opening having the same diameter as tube 22.

Skirt 35 prevents the centrifugally separated dust particles in the upper part of the passage from being drawn into filter element 2. Slanting portion 28 of annular support 26 serves to extend the annular passage above slot 25, thereby causing the angular velocity of the air to be greater at the point of removal of the dust particles through slot 25 than if the annular passage ended right at slot 25.

While the dust particles separated by centrifugal force are carried upward through the annular passage and out slot 25, the air absent these centrifugally separated dust particles is drawn through filter element 2 to its hollow center and then drawn out of outlet tube 21 into the engine manifold. The hollow center of filter element 2 and the space in the air cleaner between annular support 26 and top end wall 20b are completely sealed from the annular passage by gaskets 15 and 40. Thus, the only way for air to travel from the annular passage to outlet 21 is through paper 12.

Instead of unloader valve 23, a Mason jar or other container, or connections to an aspirator system, could be attached to the end of elbow tube 22. The essential point is that some provision is made to close the end of elbow tube 22 while a vacuum is created within the air cleaner. Otherwise efficient removal of dust by centrifugal force cannot be achieved.

What is claimed is:

1. An air cleaner adapted to be mounted in alignment with a vertical axis comprising:

a cylindrical housing aligned with the axis;

a cylindrical dry filter element having a hollow interior, the filter element being located within the housing in alignment with the axis to define with the housing an annular passage;

a downward opening inlet in alignment with the axis, the inlet directing air passing through it to the bottom of the annular passage;

means at the bottom of the annular passage for imparting a swirling motion to the air entering from the inlet;

an elbow tube mounted to the exterior side wall of the cylindrical housing near the top of the annular passage, the end of the elbow tube extending in a downward direction;

means for closing the end of the elbow tube at least while vacuum is created within the housing;

an elongated inverted trapezoidal slot formed in the side wall of the housing where the elbow tube is mounted to permit communication between the annular passage and the interior of the elbow tube, the trapezoidal slot having bases that are transverse to the vertical axis;

a supporting structure for holding the filter element with respect to the housing; and an outlet tube connected to the hollow interior of the filter element.

2. The air cleaner of claim 1, in which the closing means is an unloader valve that is attached to the end of the elbow tube, the valve being closed while a vacuum is created within the housing and being open while atmospheric pressure is created within the housing.

3. The air cleaner of claim 2, in which the outlet tube is mounted to the exterior wall of the housing above the elbow tube and the supporting structure forms above the filter element an airtight barrier in the housing between the hollow interior of the filter element and the outlet tube.

4. The air cleaner of claim 3, in which the supporting structure forms the end of the annular passage.

5. The air cleaner of claim 4, in which the means for imparting a swirling motion to the air is a louvered ring located between the lower end of the filter element and the housing and a hood having a larger diameter than the inlet is located within the ring.

6. The air cleaner of claim 5, in which the side of the hood facing the filter element is concave, a hole is formed through the hood at the axis, and a brad is inserted in the hole such that the head of the brad faces the inlet and the arms of the brad are bent to permit slight movement of the brad along the axis.

7. The air cleaner of claim 6, in which the inlet is surrounded by a rain shield having a cylindrical inner portion that extends downward from the inlet in alignment with the axis, a cylindrical outer portion that extends downward from the inlet in alignment with the axis, and a flared flange portion extending outwardly from the lower end of the cylindrical outer portion.

8. The air cleaner of claim 7, in which the supporting structure is spaced upwardly from the slot in the side wall of the housing to extend the annular passage above the slot.

9. The air cleaner of claim 8, in which the supporting structure slants upwardly and inwardly from the housing toward the filter element.

10. An air cleaner adapted to be mounted in alignment with a vertical axis comprising:

a cylindrical housing aligned with the axis;

a cylindrical dry filter element having a hollow interior, the filter element being located within the housing in alignment with the axis to define with the housing an annular passage;

a downward opening inlet in alignment with the axis, the inlet directing air passing thorugh it to the bottom of the annular passage;

means at the bottom of the annular passage for imparting a swirling motion to the air entering from the inlet;

an elbow tube mounted to the exterior side wall of the cylindrical housing near the top of the annular passage, the end of the elbow tube extending in a downward direction;

means for closing the end of the elbow tube at least while vacuum is created within the housing;

an opening formed in the side wall of the housing where the elbow tube is mounted to permit communication between the annular passage and the interior of the elbow tube;

a supporting structure for holding the filter element with respect to the housing;

an outlet tube connected to the hollow interior of the filter element;

a hood inside the air cleaner aligned with the axis near the inlet, the hood having a concave side facing the filter element so as to collect moisture present within the air cleaner;

a hole formed through the hood at the axis; and a brad inserted in the hole such that the head of the brad faces the inlet, the arms of the brad facing the filter, and the arms of the brad being bent to permit slight movement of the brad along the axis.

11. The air cleaner of claim 10, in which the opening in the side wall of the housing is an elongated slot oriented transverse to the axis.

12. The air cleaner of claim 11, in which the elongated slot is an inverted trapezoid, the bases of which are transverse to the axis.

13. The air cleaner of claim 10, in which the closing means is an unloader valve that is attached to the end of elbow tube, the valve being closed while a vacuum is created within the housing and being open while atmospheric pressure is created within the housing.

14. The air cleaner of claim 10, in which the hood has a larger diameter than the inlet and has a convex side facing the inlet to guide air smoothly into the annular passage.

References Cited

UNITED STATES PATENTS

| | | | |
|---|---|---|---|
| 1,712,947 | 5/1929 | Blair | 55—394 X |
| 1,864,201 | 6/1932 | Kegerreis et al. | 55—449 X |
| 1,870,216 | 8/1932 | Baldwin | 55—392 |
| 2,193,479 | 3/1940 | Donaldson | 55—449 X |
| 2,378,506 | 6/1945 | Sebok | 55—449 X |
| 3,216,182 | 11/1965 | Cochran et al. | 55—337 X |
| 3,360,909 | 1/1968 | Barnerias | 55—395 X |
| 3,429,108 | 2/1969 | Larson | 55—337 X |

FOREIGN PATENTS

| | | |
|---|---|---|
| 517,681 | 2/1963 | Belgium. |
| 761,710 | 11/1956 | Great Britain. |

DENNIS E. TALBERT, JR., Primary Examiner

U.S. Cl. X.R.

55—394, 429, 432, 457, 508, 510